May 25, 1965    C. H. VAN HARTESVELDT ETAL    3,185,614
METHOD AND APPARATUS FOR MAKING BOARDS FROM WOOD PRODUCTS
Filed Nov. 21, 1960            2 Sheets-Sheet 1
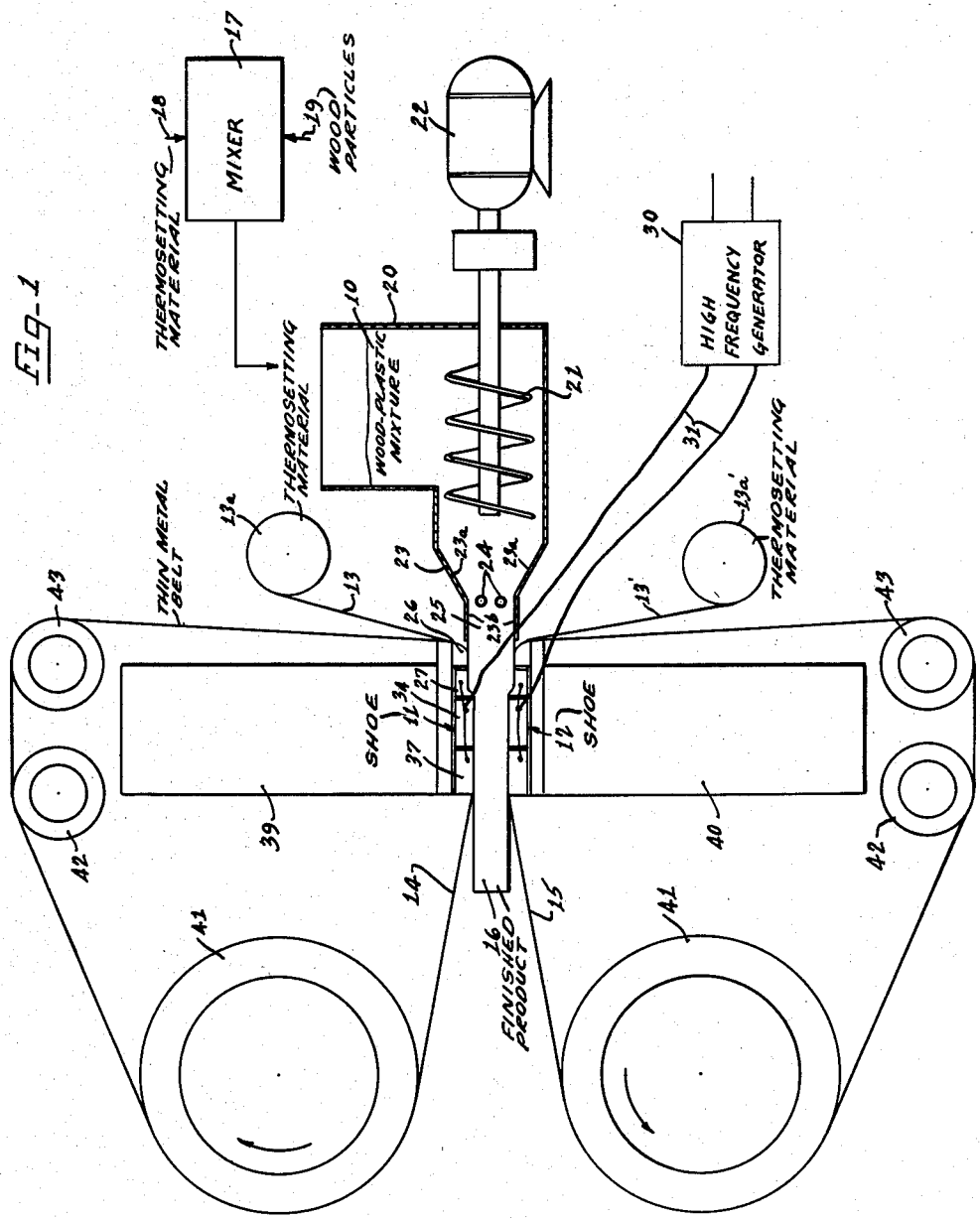
INVENTORS
Carroll H. Van Hartesveldt
BY Buddy D. Wahl
ATTORNEYS May 25, 1965   C. H. VAN HARTESVELDT ETAL   3,185,614
METHOD AND APPARATUS FOR MAKING BOARDS FROM WOOD PRODUCTS
Filed Nov. 21, 1960   2 Sheets-Sheet 2
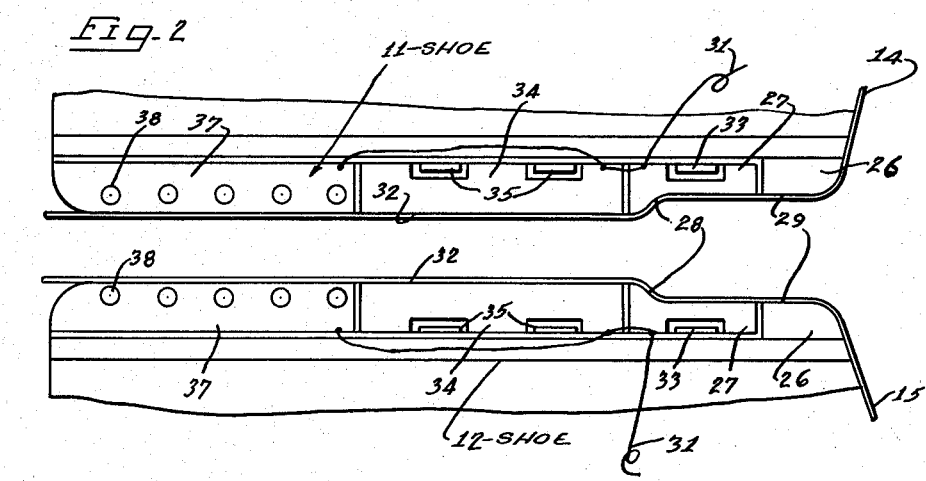
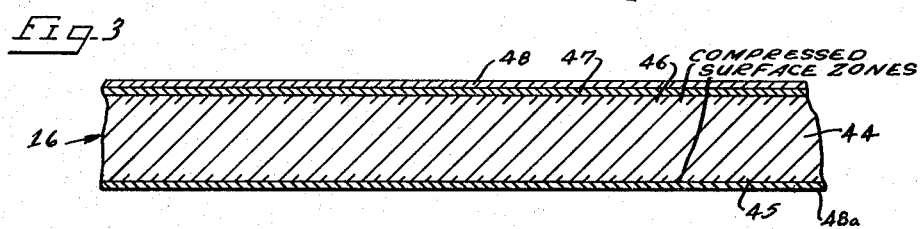
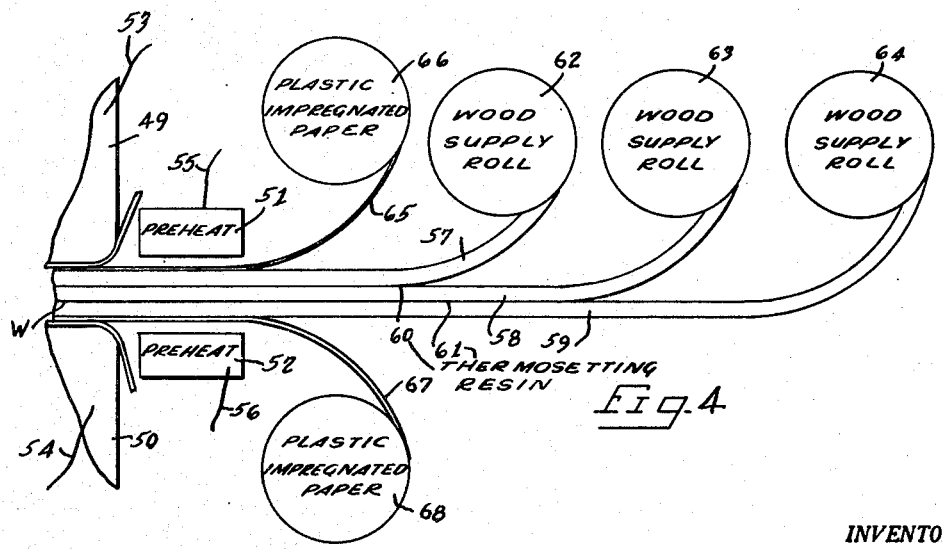
INVENTORS
Carroll H. Van Hartesveldt
BY Buddy D. Wahl
Hill, Sherman, Meroni, Gross & Simpson
ATTORNEYS

United States Patent Office 3,185,614
Patented May 25, 1965

3,185,614
METHOD AND APPARATUS FOR MAKING
BOARDS FROM WOOD PRODUCTS
Carroll H. van Hartesveldt and Buddy D. Wahl, Toledo,
Ohio, assignors, by direct and mesne assignments, to
Hoover Ball and Bearing Company
Filed Nov. 21, 1960, Ser. No. 70,572
15 Claims. (Cl. 161—261)

The present invention relates to an improved method and machine and article resulting therefrom for providing a finished slab or board formed from wood products and thermosetting materials.

More particularly, the invention contemplates making a finished board by compressing a mixture of thermosetting plastic and discrete wood particles to form a workpiece, compressing the wood at the surface beyond its elastic limit to form a hardened layer, and curing the thermosetting plastic of the workpiece while applying a finishing layer of plastic on the surface and while compressing the layer. For a hardened finished surface which may be decorative in nature, an outer layer of thermosetting resin is positioned on the surface of the board and the outer layer is cured concurrently with the setting of the thermosetting material of the workpiece.

The invention contemplates providing a method and apparatus for receiving elements of wood with thermosetting material between them, such as sawdust with 1% of a thermosetting plastic (i.e. B-stage urea-formaldehyde resin) mixed therein. The mixture is pressed together to form a workpiece which is carried between the closing faces of compressing shoes having front surfaces with a step therein for compressing the surface beyond the elastic limit of the wood and with a layer of thermosetting material over the surface. The mixture of discrete wood particles and thermosetting material is also heated so that the thermosetting plastic is cured in a single pass through the machine in a continuous rapid operation. A high frequency voltage potential is impressed across the shoes to cause a high frequency field in the material to heat the thermosetting material and complete the curing after it has passed the compression steps in the shoes.

The shoes are separately and directly heated to apply a controlled temperature to the thermosetting layer on the surface of the workpiece for curing it at an optimum rate, to be highly viscous as it passes under the compressing step of the shoes and to complete its curing after the step, and to cool it before it leaves the compressing shoes. During the time the high frequency field is completing the curing of the thermosetting plastic mixture, the workpiece is drawn through the shoes in a continuous process by traveling thin steel shims or sheets which individually pass over the insulated rolls and are driven thereby.

Accordingly, it is an object of the present invention to provide a mechanism and method of the above type which rapidly and continuously manufactures a slab-like board from a mixture of thermosetting material and discrete wood particles eliminating the necessity of manufacturing in time consuming step processes heretofore necessary.

Another object of the invention is to provide an improved method and apparatus for manufacturing an inexpensive and finished board from particles of wood such as sawdust wherein the finished product has a hard heat and moisture resistant decorative finish.

A still further object of the invention is to provide an improved apparatus and process for simultaneously both forming a slab-like wood workpiece from wood elements such as layers of wood to form plywood or thermosetting plastic mixed particles of wood to form a hardened fabricated board, and applying and curing a layer or layers of a thermosetting finishing resin over the surface thereof.

Another object of the invention is to provide an improved mechanism and method for applying heat to the core of a wood workpiece for curing binding thermosetting resin which permits simultaneous application and curing of a finishing surface of a thermosetting material.

Other objects and advantages will become more apparent with the teaching of the principles of the present invention in connection with the disclosure of the preferred embodiments thereof in the specification, claims and drawings, in which:

FIGURE 1 is a side elevational view shown largely in diagrammatic form of a mechanism embodying the principles of the present invention;

FIGURE 2 is an enlarged fragmentary sectional view of the shoes of the mechanism of FIGURE 1 and associated apparatus;

FIGURE 3 is a fragmentary enlarged sectional view showing a finished work product; and FIGURE 4 is a somewhat schematic side elevational view, with parts in sections, of another form of the invention.

As shown on the drawings:

As shown in FIGURE 1, a mixture 10 of discrete particles of cellulose or wood, such as sawdust, mixed with a thermosetting plastic and preformed into a workpiece, is moved at a substantially continuous rate past spaced opposed compressing shoes 11 and 12 to form a hardened compressed surface layer on the workpiece. A layer 13, or a plurality of layers of a thermosetting material are placed on the upper or finished surface of the workpiece and another layer 13' is placed on the lower surface and in passing between the shoes the thermosetting plastic of the mixture and the thermosetting material of the layer 13 are heated and cured. The workpiece and layer are carried over the surfaces of the shoes by traveling thin metal shims or belts 14 and 15. The shoes 11 and 12 have an electrical high frequency potential difference across them to create a high frequency field through the workpiece for generating a heat therein to cure the thermosetting plastic of the mixture. Also, the shoes are heated to their own temperature for optimum curing of the plastic layer or layers which are placed on one or both surfaces of the workpiece. The finished product is shown emerging at 16, FIGURE 1, and is shown in enlarged section in FIGURE 3.

As shown in FIGURE 1, the material for forming the wood workpiece is provided from a mixer 17 supplied with discrete particles of wood such as sawdust at 19 and supplied with the thermosetting plastic resin at 18. The mixed material is delivered to a hopper 20 and moved forwardly by a screw conveyor 21 driven by a motor 22. The material is in powder-like form to form the core of the workpiece and passes through an inwardly tapering pre-compression zone 23 to flow over pre-heaters 24 which may be electrical heating rods or tubes conducting a hot liquid. The pre-compression zone has inwardly tapering surfaces 23a followed by parallel surfaces 23b.

This forms the workpiece core 25 into shape to be moved between the shoes 11 and 12.

The workpiece 25 is carried between the shoes by the traveling stainless steel belts 14 and 15 to be compressed therebetween while the thermosetting plastic of the mixture is cured.

As shown in FIGURES 1 and 2, the shoes 11 and 12 are identical in construction and therefore the parts are similarly numbered, the only shoe 11 is numbered in detail. The shoes have a blank leadin portion 26 which extends the leadin surface portion 29 of the inwardly facing surface area of the shoes so that it is sufficiently long to provide adequate surface friction for drawing the workpiece 25 between the shoes.

Following the extension 26 is a first heated shoe section 27 provided with a heater 33. This section has a tapered step portion at a surface compressing station which applies a compression force to the wood workpiece over a local area in excess of the elastic limit of the wood. The step is sufficiently short to apply pressure over a sufficiently limited area to be able to exceed the elastic limit of the wood, and the height or depth of the step determines the amount of compression and the depth to which the wood will be permanently compressed. With a step 28 of sufficient height, a permanent compression will occur completely through the workpiece although it is adequate to apply only a surface layer of permanently compressed wood on the workpiece so that the permanently compressed layer will provide a backing and a non-yielding support for the finishing layer 13 of thermosetting material which is laid over the surface of the workpiece.

The upper outer layer 13 is shown as a single layer and is supplied from a roll 13a of plastic impregnated paper which may carry a pattern so as to provide a finished workpiece with a pattern thereon. An additional clear layer may be applied with the layer 13 to provide additional protection to the pattern layer. Or 13 may be assumed to be a combined layer. Also, if desired, a layer of thermosetting plastic 13' may be placed on the undersurface of the workpiece 25 from a roll 13a'.

After the step 28, the shoe provides a holding surface portion 32 which maintains the workpiece under compression while the cure of the thermosetting plastic is completed. Sufficient heat is imparted to the layer 13 by the leading surface 29 to partially cure the outer plastic layer and bring it to a viscous state which will prevent it from developing internal pressures that will rupture the paper of the sheet 13. The partial curing should not be so complete that the plastic becomes brittle.

The plastic of the mixture of the workpiece core 25 is heated through the center of the core by a high frequency field created by electrical leads 31 connected to each section of each of the shoes 11 and 12 and connected to a high frequency generator 30. The generator has an output to impress a potential difference across the shoes 11 and 12 for dielectric heating of the mixture of the workpiece, and generators of this type are well known to those skilled in the art and need not be described in detail. The shoes 11 and 12 are of a good conducting material such as copper or iron, and while the belts 14 and 15 are of stainless steel they serve as adequate conductors and an electrical field will be created for the full length between the shoes. The field that is created will provide a plastic curing heating effect in the workpiece, which of course is related to the material and its thickness, so that the thermosetting plastic of the workpiece will be cured by the time it emerges from between the shoes.

The high frequency field provides a heat which will penetrate the workpiece 25 for curing the plastic of the mixture and the shoe sections are heated to a temperature for optimum curing of the thermoplastic material of the surface layers 13 and 13' and the heat imparted to the layers can be controlled so that the temperature of the layers 13 and 13' will be different than the temperature of the workpiece core 25. The shoes 11 and 12 are shown constructed for providing identical heat to the surfaces of the workpiece as will be required if a layer is provided on both sides.

The shoes have a flat surface 32 after the step 28 provided by a heated section 23 and a cooled section 37. The heated section has heating elements 35 and the cooled section 37 has cooling elements 38 such as passages for a cooling fluid. The sections of the shoes are separated by a thermal insulating material 38. The finishing layers 13 and 13' are subjected to heat to be cured by the time they reach the end of the section 34 and the plastic is then rapidly cooled.

The shoes are electrically insulated from and are supported on rigid frames 39 and 40 which are mounted so as to positively fix the space between the shoes. The belts pass over and are driven by electrically insulated rolls 41, 42 and 43.

The finished workpiece 16, as illustrated in FIGURE 3, includes a compressed body portion 44 formed of particles of wood with outer zones or layers 45 and 46 compressed beyond the elastic limit of the wood to provide outer surface layers of maximum density. The entire unit provides a hard slab-like board. Above the upper hardened zone 46 is a pattern layer 47 covered by an impregnated sheet 48 of clear thermosetting plastic such as a clear melamine resin alpha cellulose combination. On the lower surface is a plastic layer 48a. In some instances it is desirable to position one or two body layers of a phenolic resin or similar material beneath the pattern layer 47.

In the practice of the instant invention the thermosetting resin used, in each of the specific coating or overcoating uses, may be any one or mixtures of the conventional commercially available thermosetting resins, which include the phenolic resins (i.e. phenol-formaldehyde condensation products) and the so-called "amine- formaldehyde" resins (the preferred members of this group being the melamine-formaldehyde condensation products). These resins are thermosetting, in the sense that they are set to their permanent infusible form by heat, during a process which, of course, involves initial fusion of the resinous material just prior to the setting, or curing process. For use in the lower layers or inner layers of sheeting or paper in the practice of the instant invention, the B-stage phenol-formaldehyde resins are preferred, because the use of these resins has certain economic advantages and they are found to be compatible with the preferred melamine resins which are used in the outer layers or the overlayers. In the practice of the invention, however, the amine-aldehyde resins may also be used. These resins are preferably formed by reaction of formaldehyde with a compound having a plurality of $NH_2$ groups in its molecule, each attached to a carbon atom which in turn is attached by a double bond to O, S or N. Thus in urea, the carbon is attached by a double bond to an oxygen atom. In thiourea the carbon is attached by a double bond to a sulfur atom; and in melamine, each carbon atom having an amino group attached thereto is in turn attached by a double bond to an intracyclic nitrogen atom. Preferred resins of the instant invention are formaldehyde condensates with polyamino triazines, such as melamine, benzoguanamine, ammeline, etc.

Although certain resins are preferred, the instant invention is not limited in use to any particular thermosetting resin. The thermosetting resins go through a cycle that is particularly adapted for use in the instant invention. For example, the thermosetting resins, initially available as condensation products, respond first to heat by liquefying into a fairly fluid state. As soon as the resin is liquefied, however, it starts to become increasingly viscous and ultimately is converted to the hard infusible state. All of this involves a very rapid cycle in conventional molding processes. In laminating processes, however, the cycle is much slower, because of difficulties in heating through the plies of the laminate and difficulties encountered by thermal damage to the plies. In the practice of the instant invention, however, an extremely rapid heating cycle is effected by the use of the particular heating means in conjunction with the extreme pressures to which the resins are subjected. This makes possible the use of higher curing temperatures without thermal damage to the plies and/or resin, because of the extremely short cycle. The invention involves conversion of the resin from its initial thermosetting or B-stage condition to the thermoset or infusible condition simultaneously with the compression step, and during the same overall period of time that the compression step is carried out. The temperature used to effect the curing or thermosetting of the resin is, of course, a temperature in the range from about 30 to about 100° F. above the conventional curing temperatures for laminating resins. It is, in fact, a temperature that is sufficient to effect curing of the resin under the conditions and within the time cycle provided for carrying out the compression step. The time cycle may range from a minimum of about 10 to 15 seconds to a practical maximum of about 1 minute. The resin curing temperatures for the preferred phenolic or polyamino-formaldehyde condensates may range from about 300 to 330° F. to as much as about 375° F. The concentration of resin impregnant in the individual sheets or layers may range from a practical minimum of about 5% (by weight) to a practical maximum of about 50%.

With respect to the binding of particulate material (i.e. the sawdust) to form the "particle board" workpiece, it will be appreciated that any of the thermosetting resins hereinbefore described may be used. Preferably, however, the ureaformaldehyde resins are used. The proportion of thermosetting resin used may range from a minimum of about 0.5% to a maximum of about 10–15% (based on total weight of the workpiece) in order to preserve the wood-like properties.

In the arrangement shown in FIGURE 4, shoes 49 and 50 are provided for compressing the surface of a wood workpiece W formed of elements or layers of wood bonded together in a manner to form plywood. A preheater is provided with electrical plates 51 and 52 to impart a pre-heat to the bonding material between the layers. The shoes 49 and 50 are connected to electrical leads 53 and 54 which in turn are connected to a high frequency generator, not shown. The plates 51 and 52 are connected to electrical leads 55 and 56 also connected to a high frequency generator not shown. It will be understood that the arrangement of FIGURE 4, with the pre-heat plates, may also be employed in forming a wood workpiece from a powdered mixture as described in connection with FIGURE 1 and the pre-heat plates would be located to impart heat in substantially the location of the heating elements 24 of FIGURE 1.

The workpiece W is formed from layers 57, 58 and 59 with a bonding thermosetting resin at 60 and 61 between the layers. The layers are fed from suitable sources such as supply rolls 62, 63 and 64. On the upper finish surface of the uppermost layer 57 is positioned a sheet of plastic impregnated paper at 65 from a roll 66. Also over the outer surface of the lower layer 59 is positioned a sheet 67 of plastic impregnated paper fed from a roll 68. These sheets or layers are cured in the same manner as with the arrangement of FIGURE 1 and are heated by sections of the shoes 49 and 50 which are not shown in detail but which have substantially the same construction of the shoes of FIGURES 1 and 2.

As a brief summary of operation, as shown in FIGURE 1, the powdered mixture 10 is fed forwardly through a precompression zone 25 to be carried between the shoes 11 and 12 by the traveling stainless steel belts 14 and 15. The mixture of the workpiece is heated to cure the thermosetting plastic by a high frequency field between the shoes 11 and 12. The layer 13 on the upper surface is heated to an optimum temperature to effect its cure by sections 27 and 34, FIGURE 2, of the shoe 11, and cooled by the section 37. The layer 13' on the lower surface is similarly cured. The finished workpiece emerges with the plastic layers on the surface.

The method and apparatus makes it possible to mold melamine and similar plastics having a minimum surface pressure requirement for curing, to the surface of the workpieces or cores having varying density. Variations in core density will be accommodated by variations in thickness of the finished hardened case on the surface of the core. In plywood, variations in the plies or uneven glue thickness will not prevent the finished moldings from being flat. The action of the leading surface is such as to increase the preload stress when oversize portions of the core center pass. This causes a movement of the line of stress at the elastic limit generated by the step action further from the surface of the core. The result of this movement is an increase in the thickness of the hardened case in proportion to the increase in thickness of the entering core. In the same manner a decrease in thickness of the entering core will result in a decrease in case thickness.

For example, a one inch board with a local decrease of .050" or 5%, in a board of one-third its ultimate density, compressed by a one-eighth inch step would have a case of .125" in general and a case of only .075" in the decreased area. The thickness of wood under strain and stressed below the elastic limit (that is wood that can spring back) is .875–.125=.750 in general and .875–.075=.800 in the local undersized area. For a modulus of elasticity of 1,000,000 and a stress at the elastic limit of 5,000, the local spring back is one-half of one percent. The variation in spring back between the oversize and undersize areas would be .050×.005 or .00025" which is .0285%. This is an increase in flatness of 175/1. This analysis also applies to oversize areas. It will therefore be noted that an important feature of the invention is its capability of manufacturing a flat product from unflat core stock.

Thus it will be seen that we have provided an improved mechanism and method which meets the objectives and advantages hereinabove set forth and wherein a completed finished board is made from inexpensive material such as waste sawdust with a single machine operation.

It will be understood that modifications and variations may be effected without departing from the spirit and scope of the novel concepts of the present invention.

We claim as our invention:

1. A finished board comprising a flat sheet formed of a mixture of discrete particles of wood and a binder of thermosetting resin and having a least one planar outer surface, said sheet including a core of said resin and natural wood particles of substantially uncompressed original structure, said planar outer surface defined by a layer of said resin and the same natural wood particles as said core compressed beyond their elastic limit and being an integral continuation of said core, said layer being coextensive with said core and providing a uniform thickness zone of said resin and casehardened wood of density greater than the density of wood in said core.

2. A finished board comprising a flat sheet formed of a mixture of discrete particles of wood and a binder of thermosetting resin and having at least one planar outer surface, said sheet including a core of said resin and natural wood particles of substantially uncompressed original structure, said planar outer surface defined by a layer of said resin and the same natural wood particles as said core compressed beyond their elastic limit and being an integral continuation of said core, said layer being coextensive with said core and providing a uniform thickness zone of said resin and casehardened wood of density greater than the density of wood in said core, and an outer finish layer of a cured thermosetting resin on said planar outer surface.

3. A method of making a finished board comprising applying a compressing force to a mixture of a thermosetting material and discrete wood particles to form a slab-like workpiece having at least one planar outer surface, applying a local pressure to the said planar outer surface of said workpiece, said local pressure being applied in a direction inclined with respect to said surface and being of a magnitude sufficient to compress the wood in said surface beyond its elastic limit and progressively moving the application of said local pressure to said surface to form a compressed surface zone, and simultaneously while applying said local pressure applying heat to the workpiece at a rate to set the thermosetting material after said local pressure has been applied.

4. The method according to claim 3 in which said heat is applied by generating a high frequency field in said workpiece.

5. The method according to claim 3 in which said local pressure is applied by continuously forcing said slab-like workpiece to move so that said outer surface is moved past a compressing surface which is inclined with respect to said outer surface and engaged therewith.

6. A method of making an endless finished board comprising continuously applying a compressing force to a mixture of a thermosetting material and discrete wood particles to form continuously a slab-like workpiece having at least one planar outer surface, continuously applying a layer of thermosetting material over the surface of said workpiece, applying a local pressure to said planar outer surface of said workpiece, said local pressure being applied in a direction inclined with respect to said surface and being of a magnitude sufficient to compress the wood in said surface beyond its elastic limit and progressively moving the application of said local pressure to said surface to form a compressed zone with said layer of thermosetting material on the surface thereof, and applying heat to the workpiece and the surface layer continuously while applying said compressing force and said local pressure and at a rate to set the thermosetting material of the mixture and to set the thermosetting layer after said local pressure has been applied.

7. The method according to claim 6 in which a first heat energy is applied to the workpiece before applying said local pressure and continuing applying such heat energy at a rate to set the thermosetting material of the mixture after said local pressure has been applied, and a second heat energy is applied to said surface layer before applying said local pressure and continuing applying such second heat energy at a rate for optimum setting of the thermosetting layer after said local pressure has been applied.

8. The method according to claim 6 comprising the further step of cooling the surface layer rapidly after heating while continuing to maintain pressure on the surface layer.

9. A method of making a finished board comprising continuously feeding a plurality of separate layers of wood in superimposed relationship past a compressing station at a substantially uniform rate with layers of binding thermosetting resin therebetween, positioning a layer of thermosetting material over the outermost surface of the layers of wood ahead of the compressing station, applying a progressing local pressure to said surface at said station forcing said thermosetting material thereagainst, said local pressure being of a magnitude sufficient to compress the wood in said surface beyond the elastic limit of the wood to permanently compress said surface thereof, simultaneously while applying the compressing force heating the resin and the thermosetting material to curing temperatures therefor and at a rate to cure the layers of resin and to cure the layer of thermosetting material after the compressing station, and thereafter while maintaining the layers of wood under compression moving said layers of wood to a cooling station and cooling such layers of wood.

10. The method according to claim 9 further including the step of heating said layer of thermosetting material and said resin ahead of said compressing station at a separate preliminary heating station at a rate insufficient to cure said layer of thermosetting material.

11. The method according to claim 10 in which said layer of thermosetting material and said resin are heated to said curing temperatures by subjecting said layers to a high frequency field.

12. Apparatus for making a finished board comprising a pair of opposed compressing shoes having flat surfaces with an inclined inwardly directed step for applying a compressing pressure, means for forcing a plurality of elements of wood with a thermosetting material between them between said shoes, and means electrically connected to said shoes for applying simultaneously a high frequency electrical potential to said shoes to generate a field in the wood for setting the thermosetting material during the time the forcing means is moving the elements of wood between said shoes.

13. Apparatus for making a finished board comprising a pair of opposed compressing shoes having flat surfaces with an inwardly inclined transverse step intermediate the ends of said shoes for applying a compressing pressure to the surface of a workpiece translated between said shoes, a pair of continuous belts extending over insulated guide rollers and slidably positioned over each of the shoes for carrying a wood workpiece formed by a mixture of thermoplastic material and discrete particles of wood, means for moving said belts for translating therebetween said mixture of thermosetting material and particles of wood between said shoes, and means electrically connected to said shoes for applying a high frequency electrical potential to the shoes during translation and compression of said mixture to generate a field in the wood for setting the thermosetting material.

14. Apparatus for making a finished board comprising a pair of opposed compressing shoes for applying a compressing pressure, means for moving a wood workpiece formed of a mixture of thermosetting material and discrete particles of wood past said shoes, means for feeding a layer of thermosetting material over said workpiece, means electrically connected to said shoes for applying simultaneously a high frequency electrical potential to said shoes to generate a field in the wood for heating and setting the thermosetting material during the time the first-named means is moving the workpiece past said shoes, and means for controllably influencing the temperature of said shoes relative to the speed of the material moving past the shoes so that the temperature of the layer of thermosetting material can be different than the workpiece for optimum curing.

15. Apparatus for making a finished board comprising a pair of opposed compressing shoes each having successive generally parallel flat surfaces with an inclined inwardly directed step between such surfaces for applying a compressing pressure, means for moving a wood workpiece between said shoes formed of a mixture of thermosetting material and discrete particles of wood, means for feeding a layer of thermosetting material over said workpiece when the workpiece is being fed between said shoes, means electrically connected to said shoes for applying a high frequency electrical potential to said shoes during movement of the workpiece between said shoes to generate a field in the wood for setting the thermosetting material, means for heating a first portion of one shoe to bring said layer to a viscous state at said step and for completing the curing of the layer after said step, and means for cooling a second subsequent portion of the shoe for cooling said layer.

References Cited by the Examiner
UNITED STATES PATENTS
1,465,383    8/23    Walsh et al. _____ 161—56

(Other references on following page)

UNITED STATES PATENTS

| | | | |
|---|---|---|---|
| 1,663,506 | 3/28 | Mason | 156—37 |
| 1,904,718 | 4/33 | Cochrane | 161—88 |
| 2,136,730 | 11/38 | Sweetland | 156—580 |
| 2,343,740 | 3/44 | Birmingham | 161—56 |
| 2,497,712 | 2/50 | Auchter | 156—278 |
| 2,543,101 | 2/51 | Francis. | |
| 2,545,370 | 3/51 | Mittelmann | 156—380 |
| 2,565,251 | 8/51 | Malmstrom | 161—56 |
| 2,587,930 | 3/52 | Uschmann | 154—110 |
| 2,602,960 | 7/52 | Fischbein | 156—580 |
| 2,642,371 | 6/53 | Fahrni | 161—162 |
| 3,032,459 | 5/62 | Uhleen | 156—321 |

FOREIGN PATENTS

| | | |
|---|---|---|
| 1,126,238 | 7/56 | France. |
| 665,275 | 1/52 | Great Britain. |
| 572,564 | 1/58 | Italy. |
| 578,168 | 6/58 | Italy. |

EARL M. BERGERT, *Primary Examiner.*

CARL F. KRAFFT, *Examiner.*